3,276,948
PRODUCT AND METHOD OF ADHERING α-OLEFIN COPOLYMERS TO FABRIC BY SULFOCHLORINATED POLYMERS AND PHENOL - ALDEHYDE RESINS
George Arthur Gallagher, Media, Pa., assignor to E. I. du Pont de Nemours and Company, Wilmington, Del., a corporation of Delaware
No Drawing. Filed July 1, 1963, Ser. No. 292,144
12 Claims. (Cl. 161—227)

This invention relates to the adhesive bonding of α-olefin hydrocarbon polymers to selected materials and, more particularly, to composite articles and a process for their preparation.

Sulfur-curable, chain-saturated α-olefin hydrocarbon copolymers (e.g., copolymers of ethylene, propylene, and non-conjugated dienes) are acquiring increasing importance today in the manufacture of a wide variety of useful products. To be used satisfactorily in applications such as tires, industrial belts, tarpaulins and the like, it is necessary that the copolymers be bonded to substrate materials such as nylon, polyethylene terephthalate, rayon or cotton.

It has quite unexpectedly been found that good adhesion is obtained between the copolymer and the substrate material by a method which employs two separate coatings on the substrate. This is even more surprising when it is considered that the use of the two coatings according to the invention yields composite articles exhibiting adhesive strengths often as high as eight times the adhesive strengths of articles prepared using either coating alone.

Briefly stated, this improvement is obtained by a process for adhering a sulfur-curable, chain-saturated α-olefin hydrocarbon copolymer to a polyamide, polyester or a cellulosic substrate which process comprises: (I) coating said substrate with a heat-hardening phenol-aldehyde type resin, (II) drying the coating material applied in step (I), (III) coating the resulting coated substrate with a sulfochlorinated polyethylene containing at least about 25 weight percent chlorine and at least about 0.4 weight percent sulfur; (IV) drying the coating applied in step (III); and (V) curing said α-olefin hydrocarbon copolymer while pressing the latter in contact with said coated substrate thereby firmly adhering the latter to the α-olefin copolymer.

The substrates being bonded to the α-olefin hydrocarbon polymers include the normally solid polyamides, polyesters, and cellulosic substrates. In a particularly valuable application of the present invention, these materials are in the form of woven fabrics, tire cords, filaments, spun fibers, or blends thereof. Representative examples ar the industrial fibers such as nylon, polyethylene terephthalate, rayon, and cotton.

The sulfur-curable chain-saturated α-olefin hydrocarbon copolymer is generally a copolymer of at least one α-monoolefin having the structure R—CH=CH$_2$ wherein R is hydrogen or alkyl of 1 to 16 carbon atoms (e.g., ethylene, propylene, 1-hexene), with at least one non-conjugated hydrocarbon diene (e.g., 1,4-hexadiene). The most preferred class of copolymers includes those containing about 20 to 75 weight percent ethylene monomer units. Representative copolymers include ethylene/propylene/1,4-hexadiene; ethylene/1,4-hexadiene; ethylene/propylene/dicyclopentadiene; and ethylene/propylene/5-methylene-2-norbornene. Other suitable monomers, copolymers and their preparation will be referred to hereinafter.

The heat-hardening phenol-aldehyde type resins are preferably those which thermally set within a temperature range of from about 65° to 225° C. without added catalysts. Suitable phenolic compounds useful in the preparation of these resins include mono- and polyhydroxy benzenes, particularly dihydroxybenzenes wherein the hydroxy groups are in the meta position with respect to each other; resorcinol is preferred. Among the suitable aldehydes, formaldehyde or materials furnishing formaldehyde such as paraformaldehyde are preferred.

The heat reactive phenol-aldehyde type resins are prepared by procedures familiar to those skilled in the art. The water-soluble type can be made by reacting 0.5 to 2.0 mols of formaldehyde with a phenolic compound such as resorcinol under conditions which are neutral to basic. A strong basic catalyst, such as an alkali metal hydroxide, is customarily employed to provide the desired pH. The mixture of the resorcinol, formaldehyde, nad alkali catalyst is usually allowed to react at about 25° C. but higher temperatures may be employed to hasten the reaction, if desired.

Generally a certain minimum time is required before the water-soluble resins have reached a sufficient degree of polymerization to be useful. Furthermore, there is a certain maximum time beyond which they are no longer useful as the first coat in this invention. These times are determined by the pH and the temperature at which the condensations are carried out. For example, a resin prepared at 25° C. and a pH of 7.0 is generally not used in less than 4 days nor more than 34 days from the date of mixing whereas a resin prepared at 25° C. and at a higher pH (for example, a pH of 8.9) is generally not used in less than 2 hours nor more than 50 hours from the time the ingredients are mixed.

Various techniques and modifications may be used in the preparation of the phenol-aldehyde type resin without departing from the scope of this invention. For example, a resin may be prepared in a more stable form and then brought to the desired composition and pH by the later addition of more formaldehyde and alkali. (A suitable resin of this type is available from the Koppers Co., Inc., as "Penacolite" R–2170 solution.)

Representative resorcinol resins have been made by reacting 0.72 to 2 molar proportions of formaldehyde with one molar proportion of resorcinol such that the final pH ranges from about 7.4 to 10.0.

Although the phenol-aldehyde type resin alone gives excellent results as the first coat of this adhesive system, it may be sometimes desirable to use mixtures of the resin and a latex in place of resin alone. Wide variations may be tolerated in the amount of latex used. For example, useful mixtures of butadiene-styrene-2-vinyl-pyridine latex and resin have been made with latex: resin ratios (dry weight) ranging from 0.5:1 to 6:1. It is within the scope of one skilled in the art to choose the particular latex and resin-latex recipe best used for a particular application. The choice between a phenol-aldehyde type resin and a resin-latex mixture will depend on the performance requirements of the particular application; for example, one reason to use a resin-latex blend would be to give the first coat more flexibility.

These phenol-aldehyde type resin-latex combinations may be prepared by first condensing formaldehyde and resorcinol to a low degree of polymerization. To the resulting resin one then adds the latex blend. The resulting composition is applied to the cord or fabric and dried.

During this period the polymerization of the resorcinol/formaldehyde resin continues. The blend can be applied by any of the procedures suitable for applying the resin itself.

As described above, the sulfochlorinated polyethylene employed contains at least about 25 weight percent chlorine and at least about 0.4 weight percent sulfur; these minimum amounts must be present in order that a strong bond be formed between the phenol-aldehyde resin layer and the sulfochlorinated elastomer layer. Furthermore, if the sulfochlorinated elastomer has a lower chlorine content, it tends to precipitate from the coating solution in the cold. For example, a chlorosulfonated elastomer having 20% chlorine and 1% sulfur can be dissolved in hot carbon tetrachloride; however, it becomes a semi-solid at room temperature and is inconvenient for application as an adhesive. The sulfur content, indicative of the presence of sulfonyl halide groups in the polymer, is quite critical.

In operating the present invention, a wide variety of sulfochlorinated polyethylenes can be used in preparing the adhesive composition. Representative sulfochlorinated polyethylenes contain from about 25 to 48% by weight chlorine and about 0.4 to 3% sulfur by weight. Preferably, these polymers contain from about 25 to 35% chlorine and from about 1 to 2% sulfur. They may be prepared by reacting polyethylenes (or chloro-substituted polyethylenes) with a mixture of chlorine and sulfur dioxide (see U.S. Patent 2,212,786 for a representative process).

Representative polymers of this type include: sulfochlorinated polymers containing 25–37% chlorine and 0.4–3% sulfur made from polyethylene, ethylene/vinyl chloride interpolymers, or ethylene vinylidene chloride interpolymers (U.S. Patent 2,586,363); sulfochlorinated polymers containing 25–45% chlorine and 0.4–3% sulfur made from hydrogenated homopolymers of conjugated hydrocarbon dienes, hydrogenated interpolymers of at least two conjugated hydrocarbon dienes and chloroprene, or hydrogenated interpolymers of hydrocarbon dienes and hydrocarbon (and chlorohydrocarbon) monoolefins (U.S. Patent 2,646,422); sulfochlorinated interpolymers of at least two $C_2$–$C_6$ alpha olefins, containing 25–35% chlorine and 0.5–3% sulfur (U.S. Patent 2,879,261); sulfochlorinated polyethylene having a chlorine content of from 38–48% and a sulfur content of 0.4–3%, the polyethylene prior to sulfochlorination having a density of from 0.935 to about 0.960, a melt index of from 0.2 to about 200, and a solubility in $CCl_4$ of at least 1% by weight (U.S. Patent 2,982,759). Hydrogenated natural rubber and polyisobutylene can also be sulfochlorinated for use in this invention.

Particularly preferred sulfochlorinated polyethylenes contain about 1% sulfur by weight and about 26.5% chlorine by weight; the polyethylene before sulfochlorination has a density of about 0.960 and a melt index of from about 0.7 to 4. (See U.S. Patents 2,586,363 and 2,862,917.)

In the first step of the process of the present invention the substrate (e.g., the fabric) is coated with the heat-hardening phenol-aldehyde type resin. This resin may be applied in any manner desired, such as by dipping, painting, or by roller coating. The coating is then dried at an elevated temperature (such as 135° C.). The amount of phenol-aldehyde type resin applied to the fabric is not critical; as little as about 2% (by weight of fabric) and as much as 10% have been used successfully.

For nylon tire cord at least about 5 weight percent of the resin is desirable but as little as about 2% is adequate.

Typical recipes for a phenol-aldehyde type resin and for a resin/latex mixture are shown below. The choice of which is used will, of course, depend on the performance requirements of the particular application; for example, one reason to use a resin/latex blend would be to give the first coat more flexibility.

| Phenol-aldehyde type resin: | Parts by wt. |
|---|---|
| Water | 100 |
| Resorcinol | 10 |
| Formaldehyde (37% water solution) | 5.3 |
| Sodium hydroxide (10% water solution) | 5.5 |
| Resin+butadiene-styrene-2-vinylpyridine latex: | |
| Water | 200 |
| Resorcinol | 10 |
| Formaldehyde (37% water solution) | 5.3 |
| Sodium hydroxide (10% water solution) | 5.5 |
| Butadiene-styrene-2-vinylpyridine (41% water latex)[1] | 98 |

[1] A useful latex of the above type may be purchased from the General Tire and Rubber Co., as "Gen-Tac" latex.

For best results the second coat should be applied as soon as possible after the first coat. It was found that the cured composite articles made from freshly dipped nylon tire cords had much more adhesive strength than those made from dipped cords which had aged for five days.

After the phenol-aldehyde type resin coating has been applied, it is necessary to remove any water present. The temperature is not a critical feature, although it should be sufficiently high to remove all of the water under the prevailing pressure. Thus, when an aqueous coating is applied and the fabric is treated at atmospheric pressure, it is usually desirable to dry the fabric in a heated zone maintained at a temperature of from about 100° to 225° C. The optimum time for this operation can be easily determined by one skilled in the art. If too little time is used the solvent is not completely removed and/or the condensation of the resin may not proceed to a sufficient degree. On the other hand, if the fabric or cord is exposed for an excess time at elevated temperatures, it is possible that the condensation of the resin can proceed to such a degree that the coated cord becomes excessively brittle. About 20 minutes at 135° C. or 1–2 minutes at 200° C. have been found to be suitable times. The optimum conditions for a given application can be easily determined by simply determining the adhesion obtained.

After the resin coat has been dried, the second composition, viz., the sulfochlorinated polyethylene, is applied thereon and dried.

The sulfochlorinated polyethylene coating composition is made up as a homogeneous dispersion of the polymer in a volatile inert organic liquid. By "volatile" is meant a liquid which boils at standard pressure below about 160° C. One class of liquids suitable for use are the chlorinated aliphatic hydrocarbons such as methylene chloride, chloroform, carbon tetrachloride, methylene bromide, and symmetrical tetrachloroethane. Another class includes aromatic hydrocarbons such as benzene, toluene, ethylbenzene, orthoxylene, and isopropylbenzene (cumene). Still another class of useful solvents includes chlorinated aromatic hydrocarbons such as chlorobenzene.

The adhesive polymer composition is prepared by thoroughly dispersing sulfochlorinated polyethylene and optional components such as curing aids, fillers, etc., in the volatile inert solvent. The order of addition is not critical; however, it is the usual practice to dissolve the sulfochlorinated polyethylene first and thereafter to introduce the remaining components. Optimum performance requires that all of the components be homogeneously dispersed and this is accomplished by conventional agitation. Ball milling is a representative procedure. The mixing can frequently be carried out at room temperature (20–30° C.), but higher temperatures can be employed when desired to reduce the viscosity and accelerate the mixing. In selecting higher temperatures those skilled in the art will, of course, take into consideration such factors as the boiling point of the inert solvent and the activation temperatures of the curing agents, if any, present in the composition.

As has been said, the employment of fillers and curing agents in the adhesive layer is optional. Approximately the same adhesive strength is obtained whether a black-loaded or a gum stock is employed; similarly, loading with mineral fillers, e.g., 20 parts per hundred of silica, does not noticeably change the adhesive value of the bond obtained after curing. It is unnecessary to employ curing agents in the adhesive layer, although curing agents such as those described below for the sulfo-curable, chain-saturated α-olefin hydrocarbon copolymer can be present, if desired.

Those skilled in the art can vary the solids concentration of the adhesive composition as needed by empirical testing to achieve optimum results for a particular application. Representative compositions have solids contents ranging between about 1 to 5% by weight, preferably about 3%.

The second layer (i.e., of the adhesive, sulfochlorinated elastomer) is applied in the conventional manner familiar to those skilled in the art. Thus, it can be brushed on the resin-coated substrate material using such conventional means as brushes, rollers, or swabs or the textile material may be dipped therein. The thickness of the coating applied will be somewhat a function of the concentration of the solution; it is generally preferred to apply an amount of coating sufficient to leave a dry layer 0.5 mil thick. If the solution is too concentrated it will leave too much of the adhesive; conversely, if it is too dilute it will leave too little adhesive and require an undesirable number of coatings. After the coating has been applied, it is necessary to dry the coated substrate material. If so desired, the sulfochlorinated polyethylene coating may be applied to the surface of the hydrocarbon copolymer or to both the latter surface and the substrate material; in both instances a well-adhered assembly is obtained. Generally, it is more convenient to apply both coatings to the same surface.

It is frequently undesirable to use both a thick coating of the resin and a thick coating of the sulfochlorinated polyethylene; the adhesive phase intervening between the fabric and the hydrocarbon elastomer becomes too thick for attainment of the best adhesive values obtainable from this system. In representative experiments with tire cords, about 4.5 to 14% of the adhesive sulfochlorinated polyethylene has been applied by weight of the dip coated cord.

Dipped nylon tire cord has been passed through a sulfochlorinated polyethylene solution (of from about 1.5 to 10 grams/100 ml. solvent) at rates ranging from about 1-3 feet per minute, the amount of coating picked up by each pass through the bath ranging from about 1 to 10% by weight of the coated cord. Frequently, about 1-4 passes through the coating bath have sufficed. The residence time in the bath is not at all critical.

After the coating has been applied, the solvent is removed; it can be air-dried at room temperatures or it can be very rapidly dried at elevated temperatures. It has been observed that the drying time at elevated temperatures can be varied quite widely without adversely affecting adhesive properties. It is, of course, conceivable that excessive exposure at elevated temperatures or use of unnecessarily high temperatures will produce undesirable reactions of the resin or sulfochlorinated polyethylene adhesive and/or undesirable reactions of the curing ingredients when present.

The second coating may consist entirely of the adhesive sulfochlorinated polyethylene. The adhesive composition, optionally, may also contain other material such as carbon black, inorganic fillers such as talc, kaolin clay, whiting, and calcined kaolin clay. Any of the conventional blacks may also be used, such as furnace blacks, channel blacks, thermal blacks, and mixtures thereof. Representative compositions containing about 3–5% of the adhesive by weight have employed about 30–50 parts of carbon black per 100 parts of adhesive. If more than about 100 parts of filler are present, per 100 parts of sulfochlorinated polyethylene, the adhesive nature of the resulting composition begins to diminish.

The α-olefin hydrocarbon copolymers are compounded with suitable curing agents before being bonded to the coated substrate. Typical curing aids used are sulfur, zinc oxide, and curing accelerators. A representative and preferred accelerator includes tellurium diethyldithiocarbamate (1.5 parts) and tetramethylthiuram disulfide (0.75 part). Those skilled in the art can select by routine empirical experiments the best combinations of accelerators when curing a particular assembly. In addition to the above-described components, the α-olefin copolymer may include such optional components as conventional antioxidants. It is to be understood that various modifications of the sulfur curing procedures may be employed depending upon the stock. Various procedures and modifications of sulfur curing are more particularly described in Encyclopedia of Chemical Technology, Kirk and Othmer, published by Interscience Encyclopedia, Inc., New York, 1953, vol. 11, pages 892–927; Principles of High-Polymer Theory and Practice, Schmidt and Marlies, published by McGraw-Hill Book Co., New York, 1948, pages 556–566; Chemistry and Technology of Rubber, edited by M. Morton, Reinhold Publishing Corp., New York, 1959, pages 93–129; The Applied Science of Rubber edited by W. J. S. Naunton, Edward Arnold Ltd., London, 1961, pages 346–413, 992–1099.

The adhered composite article is finally obtained by heating the curable assembly under pressure. Temperatures generally range between about 130–160° C. with about 150° C. and 160° C. being preferred. Cure times are not critical and can range from between about 10 minutes and 2 hours without adverse effect on the adhesion obtained. The cure time will vary inversely with the temperature, higher temperatures requiring shorter cure times. Those skilled in the art will select the particular conditions needed for optimum results based on such considerations as the conditions recommended in the art for the particular curing agents being used, etc. During the cure, pressure may be applied as desired.

The invention will now be described in and by the following examples of preferred embodiments thereof wherein parts and percentages are by weight unless otherwise specified.

EXAMPLE 1

A. *Preparation of phenol-aldehyde type resin*

A resin/latex coating composition is prepared by dissolving 27.5 grams of resorcinol in 55 cc. of distilled water in a 125-cc. Erlenmeyer flask at 25–30° C. Then 14 cc. of a 37% formaldehyde solution are added slowly with stirring and mixed for 2 minutes (mole ratio of formaldehyde to resorcinol=0.72:1). The resulting resin composition is then stoppered and stored for one hour at 25–30° C. After this period, its pH is adjusted to 7.0 by addition of a 7.85 weight percent NaOH solution.

After a 91-cc. portion of a butadiene/styrene/2-vinylpyridene latex has been measured into a jar, the above resin mixture is added dropwise while stirring is maintained (latex to resin weight ratio being about 1.1 to 1). When all the mixture has been added, stirring is continued for 3 minutes. The resulting composition (37% solids) is stored for 4 days before use. It has a useful life of 30 days from the end of the initial storage period and the pH during this useful life is in the range of 7.4 to 7.9.

B. *Preparation of sulfochlorinated adhesive composition*

A sulfochlorinated polyethylene is made in accordance with the procedures of U.S. Patents 2,586,363 and 2,862,917 and contains 1% sulfur and 26.5% chlorine;

the polyethylene before chlorosulfonation had a density of 0.96 gram/cc. and a melt index of about 0.7.

The adhesive composition is prepared by dissolving 10 grams of the latter in 128 ml. of $CCl_4$ at 25° C. and then dispersing 4 grams of super abrasion furnace (SAF) black in the solution by placing the components in a jar containing several porcelain balls and then allowing the jar to rotate on a set of moving rollers for a period of at least 16 hours at 25–30° C.

C. α-Olefin hydrocarbon elastomer

The ethylene/propylene/1,4-hexadiene copolymer employed is made in accordance with the general procedure of U.S. Patent 2,933,480. Representative samples of this copolymer contain 42–47% propylene and 3–4% 1,4-hexadiene monomer units by weight and have inherent viscosities of 2.5–3.0 (measured on a solution containing 0.1 gram of copolymer per 100 cc. of tetrachloroethylene at 30° C.).

The elastomeric copolymer is compounded as follows:

| Component: | Parts by wt. |
|---|---|
| α-Olefin hydrocarbon elastomer | 100 |
| Carbon black, HAF | 50 |
| Zinc oxide | 5 |
| Tetramethylthiuram monosulfide | 1.5 |
| 2-mercaptobenzothiazole | 0.5 |
| Sulfur | 1.0 |

D. Adhesion of elastomer to substrate material

The filament nylon fabric used is a plain weave with a count of 60 x 40 (obtainable as style SN–7 from Wellington Sears, 111 West 40th Street, New York 18, New York). The spun fabric used has 48 warp ends and 36 pick ends and weighs 9.9 oz./sq. yard. The fabric is scoured with detergent to remove finishing agents, sizes, etc.

The scoured filament nylon is soaked in water at 25° C. for a period of 1 minute and then immersed in the resin/latex (prepared in Part A above) diluted with an equal volume of water at 25° C. It is withdrawn after 5 seconds, rolled lightly to remove excess resin/latex composition and then dried at 135° C. for 20 minutes. It contains about 5.6% by weight of the resin/latex solids (i.e., the increase in weight of the fabric was 5.6%). The coated fabric is then painted with the adhesive composition of Part B at 25° C. until 9.6% by weight of solids was picked up based on the weight of the resin/latex coated fabric. Drying is carried out at 25° C. for 15 minutes. The coated nylon is re-dried for 5 minutes at 100° C. and then pressed against an 80-mil thick sheet of sulfurcurable ethylene hydrocarbon elastomer of Part C. A 3″ x 1½″ piece of cellophane is placed at one end of the elastomer to facilitate subsequent separation of the elastomer and the fabric for testing. The elastomer is supported by 10-oz. cotton duck to provide stability. The assembly is then cured at 160° C. for 30 minutes under a pressure of 200–250 p.s.i. The resulting composite article typically displays an adhesive strength of 37 lbs./linear inch at 25° C. (This is determined on an Instron tester by measuring the force necessary to separate a 1″ wide piece of the fabric from the elastomer at a head speed of 2″/min.)

If a similar piece of fabric is coated only with 6% of the resin/latex coating composition of Part A and the sulfochlorinated adhesive composition of Part B is omitted, an adhesive strength of only about 9 lbs./linear inch is obtained.

EXAMPLE 2

Example 1 is repeated except as follows: (a) The resin/latex is applied to a coating weight of 5.9% solids; (b) the sulfochlorinated adhesive is prepared by refluxing 40 grams of the sulfochlorinated polyethylene of Example 1 in 800 ml. of $CCl_4$ until a smooth composition is obtained containing 3% adhesive; this adhesive is applied to a coating weight of 12% solids; and (c) the hydrocarbon elastomer recipe includes 20 parts of naphthenic petroleum oil ("Necton 60").

The resulting composite article displays an adhesive strength of 55 lbs./linear inch.

If the example is repeated omitting the sulfochlorinated adhesive (using only 6.4% of the resin/latex composition) an adhesive strength of only about 8 lbs./linear inch is obtained.

EXAMPLE 3

The general procedure of Example 1 above is repeated except as noted herein. The resin/latex coating composition of Part A is applied to the nylon, and the coated fabric is dried at 135° C. for 20 minutes giving about 5% solids pick-up. The sulfochlorinated adhesive composition is then painted on and air-dried for 1 hour at 25° C., giving about a 10% weight pick-up. (In this example the SAF black is replaced with an equal amount of EPC black.)

A composite article, made by clamping the coating fabric against the supported elastomer, compounded as in Example 1, is cured in a press for 25 minutes at 160° C. under a pressure of 240 p.s.i. The resulting article displays an adhesive strength of about 50 lbs./linear inch at 25° C.

If the above is repeated omitting the sulfochlorinated adhesive coating and only the resin/latex coating is employed to a coating weight of about 5.1%, the article obtained exhibits an adhesive strength of only about 6 lbs./linear inch.

EXAMPLE 4

The general procedure of Example 1 is repeated except as noted hereafter. Filament nylon was scoured, soaked, and coated with 9% by weight of the resin/latex coating composition of Part A of Example 1. Three samples are made (A, B, C) containing various amounts of the sulfochlorinated adhesive composition of Example 2. The dried coated fabric is pressed against an ethylene copolymer having the same composition and compounded in the same manner as that used in Example 1. The elastomer is supported on the other side to cotton which has been coated in turn with the resin/latex coating composition of Part A of Example 1 and the sulfochlorinated adhesive composition of Example 3. The composite assembly is cured at 160° C. for 30 minutes at 240 p.s.i. pressure. The cured products exhibit the following representative adhesive strengths:

| Assembly | Weight Percent Adhesive Composition | Adhesive Strength, lbs./in. | |
|---|---|---|---|
| | | 25° C. | 100° C. |
| A | 5.8 | 48 | 20 |
| B | 8.6 | 42 | 18 |
| C | 19 | 48 | (¹) |

¹ Not tested.

EXAMPLE 5

The procedure of Example 1 is repeated except that a fabric of filament viscose rayon (a flat 2 x 1 weave with a count of 84 x 38) is coated with 6.5% by weight of the resin/latex coating composition of Part A of Example 1, dried at 135° C. for 20 minutes and then coated with 8.8% by weight of the sulfochlorinated adhesive composition of Example 3. This coated fabric is joined to an ethylene copolymer elastomer similar to that used in Example 1 but compounded as shown below. The recipe used for the elastomer is as follows:

| | Parts by wt. |
|---|---|
| α-Olefin hydrocarbon elastomer | 100 |
| Carbon black, SRF | 72 |
| Naphthenic petroleum oil (Necton 60) | 35 |
| Zinc oxide | 5 |

|                              | Parts by wt. |
|------------------------------|--------------|
| Amberol ST 137X[1]           | 10           |
| Stearic acid                 | 1            |
| Sulfur                       | 1            |
| 2-mercaptobenzothiazole      | 0.75         |
| Tetramethylthiuram monosulfide | 1.5        |

[1] An unmodified, non-reactive para-octylphenol-formaldehyde resin, sp. gr. 1.04, M.P. 65–90° C. and acid number less than 50, used in the trade as a tackifier (available from Rohm and Haas Co., Philadelphia, Pa.).

The adhered assembly obtained after a 30-minute cure at 160° C. using a pressure of about 240 p.s.i. exhibits an adhesive strength of about 28 lb./in. at 25° C.

EXAMPLE 6

Filament nylon fabric is coated with the resin/latex coating composition of Part A of Example 1 and dried as described therein to a pick-up of about 9%. The resin/latex coated nylon is then coated with 9–10% of the sulfochlorinated adhesive composition of Example 2. After being dried at 25° C. for 30 minutes, the coated nylon is cured in contact with the elastomer compounded as in Example 1 for 30 minutes at 160° C. at a pressure of 240 p.s.i. The resulting strip adhesion is about 36 lbs./linear inch at 25° C.

If the filament nylon is coated with 13% of the sulfochlorinated adhesive composition without having a previous coat of resin/latex composition, the resulting strip adhesion is only about 7 lbs./linear inch.

If the procedure of the first paragraph of this example is repeated except that 0.005 gram of HAF black is added to 34 grams of the sulfochlorinated adhesive composition, an article is obtained having an adhesive strength at 25° C. of about 29 lbs./linear inch.

EXAMPLE 7

Example 1 is repeated except as noted herein. To 34-gram portions of the sulfochlorinated adhesive composition of Example 2 are added 0.05 gram of the carbon blacks shown below. The resulting black-loaded compositions are mixed in jars on a ball mill by the procedure described above and applied to a filament nylon which has been coated with 9.5% by weight of the resin/latex coating composition of Example 1. The coated articles are dried and placed in contact with the sulfur curable ethylene copolymer compounded as in Example 1. The assemblies are then cured for 30 minutes at 160° C. at a pressure of 240 p.s.i. The following results are representative:

| Type of Carbon Black | Weight percent Black-Loaded Adhesive on Fabric | Average Adhesive Strength (lb./in.) |
|----------------------|------------------------------------------------|--------------------------------------|
| HAF                  | 7.4                                            | 31                                   |
| SAF                  | 7.1                                            | 35                                   |
| EPC                  | 7.7                                            | 34                                   |
| None                 | 7.7                                            | 33                                   |

EXAMPLE 8

Three stocks (A, B, C) are prepared by compounding the elastomer of Example 1 on a rubber roll mill in accordance with the following:

| Compounding recipe | A | B | C |
|--------------------|---|---|---|
| Elastomer of Example 1 | 100 | 100 | 100 |
| Carbon Black, HAF | 50 | | |
| Carbon Black, SRF | | 72 | 72 |
| Naphthenic Petroleum Oil (Necton 60) | | 35 | 35 |
| Zinc oxide | 5 | 5 | 5 |
| Amberol ST 137X (See Ex. 5) | | 10 | 10 |
| Stearic Acid | | 1 | |
| Sulfur | 1 | 1 | 1 |
| 2-mercaptobenzothiazole | 0.75 | 0.75 | 0.75 |
| Tetramethylthiuram monosulfide | 1.5 | 1.5 | 1.5 |

Three pieces of filament nylon as described in Example 1 which have been coated with 6% by weight of the resin/latex composition of Example 1 are then coated with 12% of an adhesive composition made by adding to the adhesive composition of Example 2 40 parts of SAF black, 5 parts of ZnO, 1 part of sulfur, 1.5 parts of tellurium diethyldithiocarbamate and 0.75 part of tetramethylthiuram disulfide per 100 parts of the sulfochlorinated polyethylene. The coating was dried for 15 minutes at 25° C.

The coated articles are placed against Stocks A, B, and C and cured for 30 minutes at 160° C. under 240 p.s.i. pressure giving the following representative adhesion values:

Strip adhesion of nylon at 25° C.

|            | Lbs./linear in. |
|------------|-----------------|
| To Stock A | 34              |
| To Stock B | 26              |
| To Stock C | 26              |

EXAMPLE 9

A 3" x 6" piece of cotton duck (10.1-oz. Army Duck made from 2 x 2 ply yarns with 52 warp and 40 fill ends) is painted with a layer of the resin/latex coating composition of Example 1 and then with a layer of the sulfochlorinated adhesive composition of Example 3.

When an adhesive pad is prepared as in Example 1 and then tested at 25° C., it is found that it takes about 28 pounds of force to separate a 1" wide piece of fabric from the elastomer stock at a rate of 2" per minute, compared with about 15 pounds when only the resin/latex coating composition is used and about 11 pounds when no adhesive is used (i.e., when both the resin/latex and sulfochlorinated coatings are omitted).

EXAMPLE 10

A 3" x 6" piece of plain woven spun nylon is coated with about 12–13% of the resin/latex coating composition of Example 1 and then with a coating of the sulfochlorinated adhesive composition of Example 2. An adhesion pad made up as in Example 1 has an adhesive bond strength of about 45 lbs./linear inch.

EXAMPLE 11

A phenol-aldehyde type resin is prepared by mixing 55.6 cc. of distilled water with 4.41 cc. of 7.85% aqueous NaOH in a flask at 25–30° C. and then adding 2.76 g. of resorcinol and mixing until dissolved. Then 3.80 cc. of 37% aqueous formaldehyde solution are added slowly with stirring. After 2 minutes agitation the resin solution is aged for about 44 hours at 25–30° C. before use.

A 3" x 6" piece of spun rayon fabric is coated with about 12–15% of the above resin composition and then coated with 12% of the sulfochlorinated adhesive composition of Example 2. The fabric is cured for 30 minutes at 160° C. under 240 p.s.i. pressure against 3" x 6" pieces of the elastomer of Example 1 compounded as in Example 2. An adhesive strength of about 38 lbs./linear inch is obtained when tested at 25° C. on an Instron tester using a head speed of 2"/min. If, however, the example is repeated but both coatings are omitted, the adhesive strength is only about 25 lbs./linear inch.

EXAMPLE 12

A phenol-aldehyde type resin is prepared by adding 5 cc. of 37% aqueous formaldehyde solution, and 5.0 cc. of 10% aqueous NaOH solution, in turn, to a solution of 10.0 g. of resorcinol in 100 cc. of distilled water in a flask at 25–30° C. The resin solution is stoppered and allowed to stand for 44 hours before use.

A 3" x 6" piece of rayon filament fabric (a flat 2 x 1 weave with a count of 84 x 38) is coated with about 3–4% coating of the above resin and then coated with about 12% of the sulfochlorinated adhesive composition of Example 2.

The coated fabric is then cured for 30 minutes at 160° C. against a 3″ x 6″ piece of the elastomer of Example 1 compounded as in Example 2. The composite article obtained has an adhesive strength of about 25 lbs./linear inch.

If the example is repeated except that the coating of sulfochlorinated adhesive is omitted an adhesive strength of only about 13 lbs./linear inch is obtained.

EXAMPLE 13

A 3″ x 6″ piece of filament polyester fabric (made from filament fibers and having 60 warp ends and 48 fill ends) is coated with 21–25% of the resin/latex composition of Example 1 and then coated with 9.7% of the sulfochlorinated adhesive composition of Example 2. After being cured for 30 minutes at 160° C. and 240 p.s.i. pressure against the elastomer compounded as in Example 1, the coated fabric typically requires about 24 lbs./linear inch of force to separate it from the elastomer substrate.

If the example is repeated but the sulfochlorinated adhesive is omitted, the adhesive strength is only about 8 lbs./linear inch.

EXAMPLE 14

The elastomer selected is an ethylene/1,4-hexadiene copolymer made in accordance with the general procedure of U.S. Patent 2,933,480 using a vanadium tris(acetylacetonate)/diisobutyl aluminum chloride catalyst. The copolymer has an inherent viscosity of about 0.91, (measured as in Example 1) and contains about 43 weight percent 1,4-hexadiene.

A 3″ x 6″ piece of filament nylon is coated with 8% of the resin/latex composition of Example 1 and then coated with 12% of the sulfochlorinated adhesive composition of Example 2. The coated fabric is then cured for 30 minutes at 160° C. against the elastomer which has been compounded as shown below.

| Component: | Parts by wt. |
|---|---|
| Elastomer | 100 |
| Carbon Black, HAF | 50 |
| ZnO | 5 |
| Sulfur | 0.5 |
| Pyridinium pentamethylene dithiocarbamate | 1.75 |

The composite article exhibits an adhesive strength of about 18 lbs./linear inch. If, however, the example is repeated except that the sulfochlorinated adhesive coating is omitted, the adhesive strength is only about 13 lbs./linear inch.

EXAMPLE 15

Seven samples of nylon tire cord are coated with 5.7% of the following resin/latex mixture:

After 55.6 cc. of distilled water and 4.41 cc. of a 7.8% aqueous NaOH solution have been stirred together in a 125-cc. Erlenmeyer flask at 25–30° C., 2.76 g. of resorcinol are added and mixed until dissolved. Then 3.80 cc. of 37% aqueous formaldehyde solution are added slowly with stirring. The resulting resin mixture is then agitated for two minutes, stoppered, and stored at 25–30° C. for 6 hours before further use.

A 62.2-cc. portion of "Gen-Tac" latex described in Example 1 is then measured into a 16-oz. jar. After 15.3 cc. of distilled water have been slowly introduced with stirring, the above-prepared resin mixture is added slowly with agitation. After being stirred for 3 minutes, the resulting composition is capped and stored for at least 4 hours before use. During its useful life of about 48 hours, measured from the end of the 4-hour storage period, its pH (at 25–30° C.) is in the range of about 9.6 to 10.0. They were then each coated with a solution such as that described in Part B of Example 1 except that the sulfochlorinated polyethylenes A through G (identified in Table I below) were substituted for that used in Part B of Example 1.

TABLE I

| Adhesive | Melt Index [1] of P.E. | Density [1] of P.E. | Percent S | Percent Cl |
|---|---|---|---|---|
| A | 4 | 0.959 | 0.4 | 49.2 |
| B | 4 | 0.959 | 1 | 34.5 |
| C | 4 | 0.959 | 1.1 | 48.7 |
| D | 4.37 | 0.960 | 1.4 | 27.1 |
| E | 4 | 0.959 | 2.15 | 34.1 |
| F | 10 | 0.919 | 4.1 | 48 |
| G | 0.7 | 0.96 | 1 | 26.5 |

[1] Of the polyethylene before sulfochlorination.

These cord samples are then used to conduct "single-cord adhesion" tests on "H-pull tests" as described in India Rubber World, 114, 213–17 (1946). The coated cord samples are molded as described in the reference into the sulfur-curable ethylene hydrocarbon elastomer which was compounded as described in Example 2 and the assemblies cured for 40 minutes at 160° C. under a pressure of 3500 p.s.i., starting with the mold at room temperature. The resulting composite articles are tested as described in the reference and display the representative adhesive strengths shown in Table II.

TABLE II

| Adhesive | Percent Adhesive on Cord by Wt. | Adhesive Strength, lbs. per single cord | |
|---|---|---|---|
| | | 25° C. | 140° C. |
| A | 9.5 | 10.5 | 5.5 |
| B | 13.3 | 14.5 | 5.5 |
| C | 9.1 | 14.5 | 5.5 |
| D | 9.5 | 20.0 | 6.5 |
| E | 9.8 | 17.5 | 7.5 |
| F | 9.2 | 12.5 | 6.5 |
| G | 10.5 | 18.0 | 8.0 |

If, however (departing from the invention), the example is repeated using the sulfochlorinated polyethylenes above with (1) a chlorinated polyethylene having 34% Cl and 0% sulfur prepared from polyethylene having a melt index of 4 and a density of 0.959; or (2) a chlorinated polyethylene having 25% Cl and 0% sulfur prepared from a polyethylene having a melt index of 10 and a density of 0.919, the following results are representative:

| Chlorinated Polyethylene | Coating Weight | Adhesive Strength | |
|---|---|---|---|
| | | 25° C. | 140° C. |
| (1) | 9.1 | 4.5 | 2.5 |
| (2) | 10.9 | 4.0 | 2.0 |

This comparison will illustrate that a substitution of a chlorinated polyethylene (outside the scope of the invention) for the sulfochlorinated adhesives of the invention will produce adhesive strengths less than half the values illustrated in Table II.

EXAMPLE 16

Three samples of nylon tire cord are coated with 9.0% of the resin/latex mixture of Example 1 and then coated with 4.5%, 8.3% and 14.5%, respectively, of the sulfochlorinated adhesive composition of Example 3. These cord samples are then tested according to the H-pull test described in Example 15. The results are shown below:

| Percent Adhesive Composition | H-pull adhesion, lbs./cord | |
| --- | --- | --- |
| | 25° C. | 140° C. |
| 4.5 | 17.0 | 10.5 |
| 8.3 | 18.5 | 10.5 |
| 14.5 | 19.5 | 10.0 |

In addition to the α-monoolefins disclosed hereinabove, the following are also useful in preparing the α-olefin hydrocarbon elastomeric copolymers: ethylene; propylene; 1-butene; 4-methyl-1-pentene; 1-pentene; 1-hexene; 1-heptene; 1-octene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 4,4-dimethyl-1-hexene; 5,6,6-trimethyl-1-heptene; 1-dodecene; and 1-octadecene.

Suitable non-conjugated dienes, in addition to those already disclosed, include: open-chain $C_6-C_{22}$ dienes having the structure

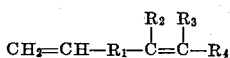

wherein $R_1$ is an alkylene radical, $R_2$, $R_3$, and $R_4$ are independently selected from the group consisting of hydrogen and alkyl radicals; 5-alkenyl-substituted-2-norbornene; 5-methylene-3-norbornene; 2-alkyl-2,5-norbornadiene; and 1,5-cyclooctadiene.

The curable, elastomeric α-olefin hydrocarbon copolymers can be prepared by methods known in the art and disclosed, for example, in U.S. Patents 2,933,480; 3,000,866; 3,063,973; 3,093,620 and 3,093,621 as well as in U.S. Patents 3,000,867; 2,975,159; French Patent 1,212,527; British Patent 857,183 and many other U.S. and foreign patents.

The strengths of the adhesive bonds formed in composite articles prepared according to this invention are close to the mechanical limits of the elastomer and/or the cord. The improvements shown represent a major improvement in adhesion and can mean the difference between acceptable and unacceptable performance in use.

What is claimed is:

1. A process for adhering a sulfur-curable, chain-saturated, α-olefin hydrocarbon copolymer to a substrate selected from the group consisting of polyamide, polyester or cellulosic substrates, which process comprises: (I) coating said substrate with a heat-hardening phenol-aldehyde type resin, (II) drying the coating applied in step (I), (III) coating the resulting coated substrate with a sulfochlorinated polyethylene containing at least about 25 weight percent chlorine and at least about 0.4 weight percent sulfur, (IV) drying the coating applied in step (III); and (V) curing said elastomeric hydrocarbon copolymer while pressing the latter in contact with said coated substrate, thereby firmly adhering the latter to the hydrocarbon copolymer.

2. A process for adhering a substrate selected from the group consisting of polyamide, polyester and cellulosic substrates to a sulfur-curable elastomeric chain-saturated α-olefin hydrocarbon copolymer of at least one α-monoolefin of the structure R—CH=CH$_2$ wherein R is selected from the group consisting of hydrogen and alkyl of from 1 to 16 carbon atoms, and at least one nonconjugated hydrocarbon diene, which process comprises: (I) coating said substrate with a heat-hardening phenol-aldehyde type resin, (II) drying the coating applied in step (I), (III) coating the resulting coated substrate with a sulfochlorinated polyethylene containing from about 25 to 48 weight percent chlorine and from about 0.4 to 3 weight percent sulfur, (IV) drying the coating applied in step (III); and (V) curing said hydrocarbon copolymer while pressing the latter in contact with said coated substrate, thereby firmly adhering the latter to the hydrocarbon copolymer.

3. A process as defined in claim 2 wherein said nonconjugated hydrocarbon diene is selected from the group consisting of 1,4-hexadiene and dicyclopentadiene.

4. A process for adhering a substrate selected from the group consisting of polyamide, polyester and cellulosic substrates to a sulfur-curable elastomeric, chain-saturated hydrocarbon copolymer selected from the group consisting of copolymers of (a) ethylene/propylene/1,4-hexadiene, (b) ethylene/propylene/dicyclopentadiene, and (c) ethylene/1,4-hexadiene, with process comprises (I) coating said substrate with a heat-hardening phenol-aldehyde type resin, (II) drying the coating applied in step (I), (III) coating the resulting coated substrate with a sulfochlorinated polyethylene containing from about 25 to 35 weight percent of chlorine and from about 1 to 2 weight percent sulfur, (IV) drying the coating applied in step (III); and (V) curing said hydrocarbon copolymer while pressing the latter in contact with said coated substrate, thereby firmly adhering the latter to the hydrocarbon copolymer.

5. An assembly curable to an adhered composite article comprising (I) a sulfur-curable, chain-saturated α-olefin hydrocarbon copolymer in contact with (II) a substrate selected from the group consisting of polyamide, polyester and cellulosic substrates, said substrate having a first coating of (a) a heat-hardening phenol-aldehyde type resin, and (b) a second coating thereover of a sulfochlorinated polyethylene containing at least about 25 weight percent chlorine and at least about 0.4 weight percent sulfur.

6. An assembly curable to an adhered composite article comprising (I) a sulfur-curable, elastomeric, chain-saturated α-olefin hydrocarbon copolymer of at least one α-monoolefin of the structure R—CH=CH$_2$ wherein R is selected from the group consisting of hydrogen and alkyl of from 1 to 16 carbon atoms, and at least one nonconjugated hydrocarbon diene in contact with (II) a substrate selected from the group consisting of polyamide, polyester and cellulosic substrates, said substrate having a first coating of (a) a heat-hardening phenol-aldehyde type resin, and (b) a second coating thereover of a sulfochlorinated polyethylene containing from about 25 to 48 weight percent chlorine and from about 0.4 to 3 weight percent sulfur.

7. An assembly as defined in claim 6 wherein said nonconjugated hydrocarbon diene is selected from the group consisting of 1,4-hexadiene and dicyclopentadiene.

8. An assembly curable to an adhered composite article comprising (I) a sulfur-curable, elastomeric, chain-saturated α-olefin hydrocarbon copolymer selected from the group consisting of copolymers of (a) ethylene/propylene/1,4-hexadiene, (b) ethylene/propylene/dicyclopentadiene, and (c) ethylene/1,4-hexadiene, in contact with (II) a substrate selected from the group consisting of polyamide, polyester and cellulosic substrates, said substrate having a first coating of (a) a heat-hardening phenol-aldehyde type resin, and (b) a second coating of a sulfochlorinated polyethylene containing from about 25 to 35 weight percent chlorine and from about 1 to 2 weight percent sulfur.

9. An adhered, cured composite article comprising (I) a sulfur-curable, chain-saturated α-olefin hydrocarbon copolymer adhesively united to (II) a substrate selected from the group consisting of polyamide, polyester and cellulosic substrates, said substrate having a first coating of (a) a heat-hardening phenol-aldehyde type resin, and (b) a second coating thereover of a sulfochlorinated polyethylene containing at least about 25 weight percent chlorine and at least about 0.4 weight percent sulfur.

10. An adhered, cured composite article comprising (I) a sulfur-curable, elastomeric, chain-saturated α-olefin hydrocarbon copolymer of at least one α-monoolefin of the structure R—CH=CH$_2$ wherein R is selected from the group consisting of hydrogen and alkyl of from 1 to 16 carbon atoms, and at least one non-conjugated hydrocarbon diene, adhesively united to (II) a substrate selected from the group consisting of polyamide, polyester and cellulosic substrates, said substrate having a first coating of (a) a heat-hardening phenol-aldehyde type resin, and (b) a second coating thereover of a sulfochlorinated polyethylene containing from about 25 to 48 weight percent chlorine and from about 0.4 to 3 weight percent sulfur.

11. An adhered, cured composite article as defined in claim 10 wherein said non-conjugated hydrocarbon diene is selected from the group consisting of 1,4-hexadiene and dicyclopentadiene.

12. An assembly curable to an adhered composite article comprising (I) a sulfur-curable, elastomeric, chain-saturated α-olefin hydrocarbon copolymer selected from the group consisting of copolymers of (a) ethylene/propylene/1,4-hexadiene, (b) ethylene/propylene/dicyclopentadiene, and (c) ethylene/1,4-hexadiene, adhesively united to (II) a substrate selected from the group consisting of polyamide, polyester and cellulosic substrates, said substrate having a first coating of (a) a heat-hardening phenol-aldehyde type resin, and (b) a second coating of a sulfochlorinated polyethylene containing from about 25 to 35 weight percent chlorine and from about 1 to 2 weight percent sulfur.

References Cited by the Examiner

UNITED STATES PATENTS

| | | | |
|---|---|---|---|
| 2,748,049 | 5/1956 | Kalafus | 156—335 X |
| 2,933,480 | 4/1960 | Gresham | 260—80.5 |
| 3,060,070 | 10/1962 | Atwell | 161—253 X |
| 3,179,554 | 4/1965 | Gladding et al. | 161—254 X |

FOREIGN PATENTS 141,582   4/1948   Australia.

EARL M. BERGERT, *Primary Examiner.*

C. B. COSBY, *Assistant Examiner.*